United States Patent [19]

Munro

[11] Patent Number: 4,864,438
[45] Date of Patent: Sep. 5, 1989

[54] TAPE CARTRIDGE MOVEMENT MANAGEMENT IN AN AUTOMATED TAPE CARTRIDGE LIBRARY SYSTEM

[76] Inventor: Frederick G. Munro, 2315 Ridge Cir., Broomfield, Colo.

[21] Appl. No.: 148,600

[22] Filed: Jan. 27, 1988

[51] Int. Cl.$^4$ ............... G11B 15/68; G11B 17/22; B65G 1/00
[52] U.S. Cl. ............... 360/92; 198/349.6; 360/98.05; 369/33; 369/34; 364/478; 414/273
[58] Field of Search ............... 369/32, 33, 34, 36, 369/37, 38, 39; 414/273, 786; 198/349.6, 366; 360/71, 72.2, 72.3, 92, 98.04, 98.05, 98.06, 99.07; 364/478

[56] References Cited

U.S. PATENT DOCUMENTS

| | | | |
|---|---|---|---|
| 3,831,197 | 8/1974 | Beach et al. | 360/71 |
| 3,938,190 | 2/1976 | Semmlow et al. | 360/92 |
| 4,271,440 | 6/1981 | Jenkins et al. | 360/92 |
| 4,654,727 | 3/1987 | Blum et al. | 360/71 |
| 4,766,581 | 8/1988 | Korn et al. | 369/34 |
| 4,779,151 | 10/1988 | Lind et al. | 360/92 |
| 4,802,035 | 1/1989 | Phtsuka | 360/92 |

Primary Examiner—Steven L. Stephan
Attorney, Agent, or Firm—Dorr, Carson, Sloan & Peterson

[57] ABSTRACT

The tape cartridge movement management apparatus for an automated tape cartridge library system includes a database that identifies each tape cartridge stored in the library system and its physical location, whether in its home position or in transit. In addition, a path selection apparatus is used to regulate the movement of the tape cartridges between their home positions and the designated destinations. This apparatus selects a path between two end points, reserves the apparatus to transport the designated tape cartridge between these two end points and maintains the apparatus reservations until the movement of the tape cartridge is successfully completed. In this fashion, if the movement of the tape cartridge is blocked somewhere along the path, the apparatus remains reserved to return the designated tape cartridge back to its original or home position.

22 Claims, 11 Drawing Sheets

| Source Library Module | Destination Library Module | Intermodule Distance |
|---|---|---|
| 1 | 2 | 1 |
| 1 | 3 | 1 |
| 1 | 4 | 2 |
| 2 | 1 | 1 |
| 2 | 3 | 1 |
| 2 | 4 | 1 |
| 3 | 1 | 1 |
| 3 | 2 | 1 |
| 3 | 4 | 1 |
| 4 | 1 | 2 |
| 4 | 2 | 1 |
| 4 | 3 | 1 |

FIG 7

TAPE CARTRIDGE MOVEMENT MANAGEMENT IN AN AUTOMATED TAPE CARTRIDGE LIBRARY SYSTEM

FIELD OF THE INVENTION

This invention relates to automated library systems and, in particular, to a method of transporting magnetic tape cartridges among a plurality of interconnected automated tape cartridge library modules.

PROBLEM

It is a problem in data processing systems to provide data storage capacity that is both inexpensive, readily accessible to the user and expandable into a multiple module data storage system. The presently available choices for data storage are: on-line automated systems using direct access storage devices (DASD) that are directly connected to the computer, simple single module automated tape library systems, or off-line manual systems using 9 or 18 track magnetic tape cartridges that are manually retrieved by an operator and loaded on a tape drive. The on-line DASD memory provides immediately available data but is very expensive and has a limited storage capacity because it cannot be expanded into multiple modules. The single module automated tape library systems provide additional data storage capacity but cannot be expanded beyond a single module. The off-line manually loaded magnetic tape cartridge memory is inexpensive per unit of data storage, has unlimited expansion capacity but is very slow in terms of data retrieval times.

A multi-module automated tape cartridge library provides advantages over all existing data storage systems. However, a difficulty with implementing a multi-module automated tape cartridge library is the management of the contents thereof. Identification of the "home location" of each tape cartridge must be maintained as well as records of the location at all times of any tape cartridges removed from their home locations. In addition, for each tape cartridge that is transported through a multi-module library, a path must be selected from the home location to the destination and vice versa. Existing path selection algorithms used in the fields of telephony and data transmission are not suited to this environment. These path selection algorithms are all predicated on the concept that the transmission can be aborted and the signals retransmitted. Such an option is not available in the transportation of a tape cartridge through a multi-module library system where a plurality of other tape cartridges are also in transit.

Solution

The aforementioned problems are solved and a technical advance achieved in the field by the tape cartridge movement management apparatus in an automated tape cartridge library system. The automated tape cartridge library system consists of a plurality of independent yet interconnectable automated tape cartridge library modules. The library modules are connected to one or more host computers and function to retrieve data that is located on 18 track magnetic tape cartridges stored in the library modules. Each library module consists of two concentrically arranged cylindrical arrays of tape cartridge storage cells. A robot arm, pivotally rotatable about the center axis of the concentrically arranged cylinders contains a tape cartridge retrieval mechanism. This tape cartridge retrieval mechanism is located between the two concentrically arranged cylindrical arrays of tape cartridge storage cells for retrieving and replacing tape cartridges in the tape cartridge storage cells, thereby eliminating the need for manual retrieval of the tape cartridges. The inner and outer cylindrical arrays of tape cartridge storage cells are arranged to be loaded from this common area between the two cylindrical arrays so that the tape cartridge retrieval mechanism accesses both cylindrical arrays from this common area.

The entire library module is enclosed in a secure exterior housing which also serves to provide structural support to the two concentrically arranged cylindrical arrays of tape cartridge storage cells. The exterior housing of this expandable automated tape cartridge library system is in the shape of a dodecahedron. The twelve sides provided by this exterior housing enable a plurality of the library modules to be interconnected. A control unit is connected to one of the twelve faces of the exterior housing to provide the control circuitry and software to regulate the operation of the robot arm contained in the library module. In addition, one or more tape drive units may be mounted on other ones of the twelve sides of the library module exterior housing.

The control unit regulates the operation of the robot arm to retrieve and mount a selected tape cartridge on a tape drive. The actual tape cartridge and tape drive selection is accomplished by both tape cartridge library software in the host computer and a library management unit that is interposed between the host computer and the control unit of the library module. The host computer responds to a user requesting access to a particular tape cartridge by issuing a tape cartridge mount command to the operator console of the host computer. Tape cartridge library software on the host computer intercepts this command and identifies the tape cartridge to be loaded by the library module. This tape cartridge library software located on the host computer translates the identification of the selected tape cartridge to a physical location of the tape cartridge storage cell within the library storage module where the selected tape cartridge is located. In addition, the tape cartridge library software on the host computer selects an available tape drive into which the selected tape cartridge is mounted.

The control unit activates the robot arm which consists of a six-motion, servo-controlled mechanism in response to control signals received from the library management unit. This robot arm mechanism contains the necessary apparatus to accurately locate and retrieve the selected tape cartridge from the identified tape cartridge storage cell in the cylindrical array, transport the selected tape cartridge to the designated tape drive unit and load the selected tape cartridge into the tape drive unit so that the data can be retrieved therefrom by the host computer. The robot arm mechanism can also retrieve the tape cartridge from the tape drive unit once the host computer has completed its data retrieval from the selected tape cartridge. The robot arm mechanism then returns the tape cartridge to the designated tape cartridge storage cell in the storage cell array.

A plurality of the automated tape cartridge library modules can be interconnected by placing two or more of the automated tape cartridge library modules together in an adjacent abutting fashion. Each automated tape cartridge library module is equipped with one or more pass-through ports which provide a mechanism for transferring a selected tape cartridge from the automated tape cartridge library module in which it is stored to another automated tape cartridge library module which abuts the pass-through port. Thus, the pass-through port mechanism is the means that interconnects two adjoining automated tape cartridge library modules and that enables a tape cartridge to be passed by one robot arm in a first automated tape cartridge library module to the robot arm in the second automated tape cartridge library module. Thus, tape cartridges can be passed among the plurality of interconnected automated tape cartridge library modules.

Thus, by coordinating the operation of a plurality of automated tape cartridge library modules, each and every tape cartridge in the library can be mounted on any selected tape drive unit in the entire complex. This is accomplished by transporting a selected tape cartridge from the automated tape cartridge library module in which it is stored to the automated tape cartridge library module that contains the available tape drive unit. The selected tape cartridge is passed from automated tape cartridge library module to automated tape cartridge library module through the pass-through port that interconnects adjoining automated tape cartridge library modules.

Management of the tape cartridge movement in the automated tape cartridge library system is accomplished by control apparatus in the tape cartridge library software on the host software. Included in this control apparatus is a database that identifies each tape cartridge stored in the library system and its physical location as specified by the identification of its associated tape cartridge storage cell "home position". In-transit records indicate the location of each tape cartridge that has been removed from its home position. The in transit records include the identification of the destination of the tape cartridge and the reason for relocation.

A key element in this control apparatus is the path selection apparatus that regulates the movement of the tape cartridges between their home positions and designated destinations. The path selection apparatus identifies both endpoints of the path, then searches for the shortest path between these two endpoints. This is accomplished by maintaining a table in the library management unit of the "distance" between all pairs of library module in the multi-module automated tape cartridge library system.

Once a path is selected, pass-through port slots are reserved in each library module in the path to insure the availability of the path. The tape cartridge is then transported along this path to the destination. The pass-through port slot reservations are maintained along every segment of the selected path until the tape cartridge reaches the designated destination. If the tape cartridge movement is blocked at any point along the path, the sequentially executed steps are executed in reverse order and reverse direction to return the tape cartridge to its home position. If a complete path is not available, the tape cartridge movement request is placed in a queue and attempted at a later time. Also, for the oldest tape cartridge movement request, a predefined path is selected and all idle apparatus in the path reserved. The busy apparatus in this path is monitored and when it returns to an idle state, it is reserved. This process is repeated until a complete path is reserved.

This control apparatus provides the tape cartridge movement management to implement a multi-module automated tape cartridge library system. The exact location of each tape cartridge, whether in home position or in-transit, is recorded in memory. In addition, a path selection and reservation process provides a secure, reversible path to transport tape cartridges between selected endpoints. These and other capabilities are disclosed in the detailed description.

BRIEF DESCRIPTION OF THE DRAWING

FIG. 7 illustrates the inter-library module distance table format;

DETAILED DESCRIPTION OF THE DRAWINGS

Figure 1:
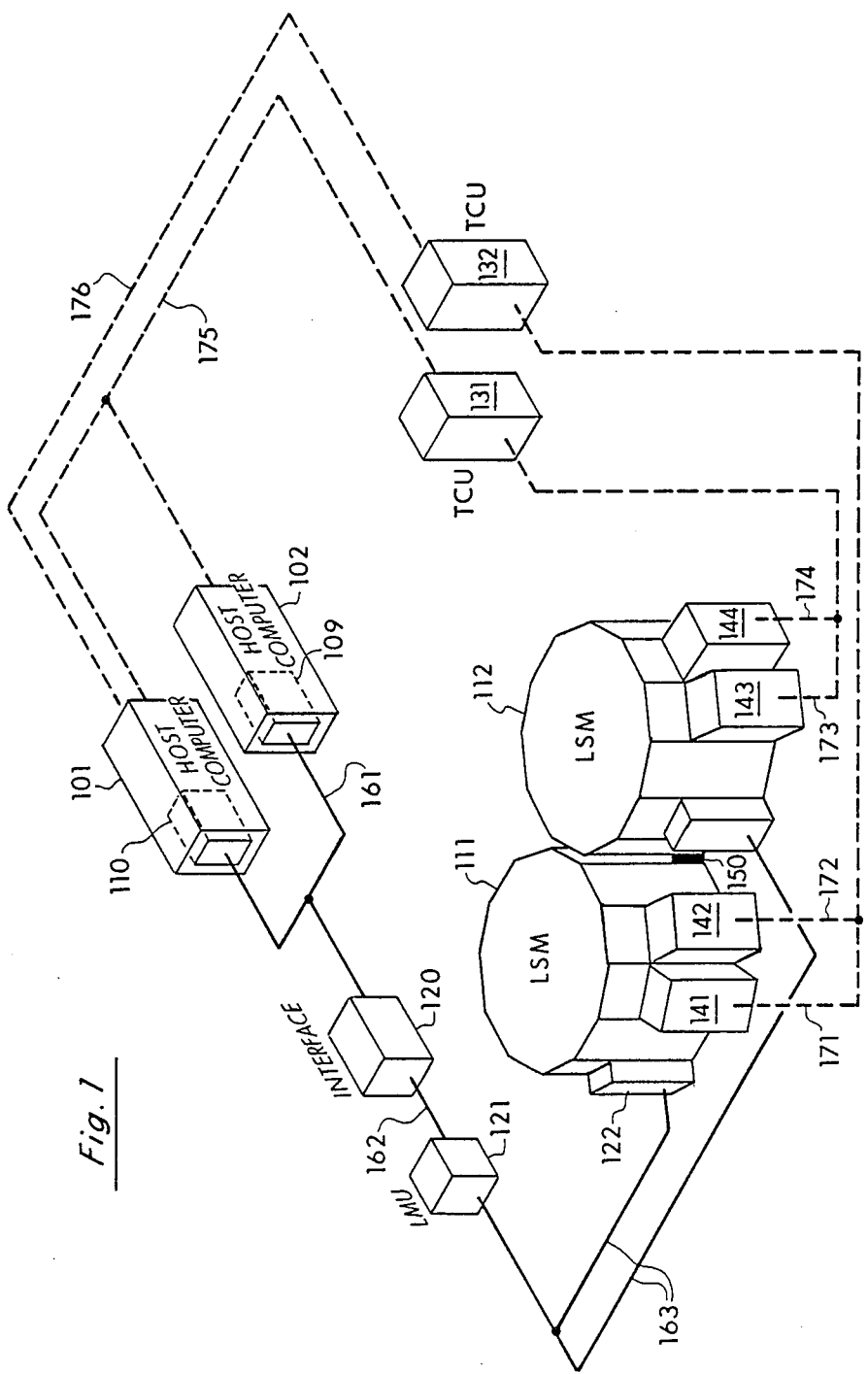
FIG. 1 illustrates the automated tape cartridge library system in block diagram form.

FIG. 1 illustrates in block diagram form the multi-module automated magnetic tape cartridge library system. A plurality of host computers 101, 102 are shown connected to the multi-module automated magnetic tape cartridge library system by means of two paths, a control path 161, 162 and a data path 171-175 described in more detail below. A plurality (up to sixteen) of host computers can be interconnected to a plurality (up to sixteen) of automated magnetic tape cartridge library systems, but only two computers and a single multi-module automated tape cartridge library system are illustrated for simplicity. The automated magnetic tape cartridge library system consists of a plurality of elements. Among these elements are included two automated magnetic tape cartridge library modules (library modules) 111 and 112, each of which stores 18 track magnetic tape cartridges of the IBM 3480 type for use by host computers 101, 102. Each of library modules 111 and 112 stores up to 6,000 of the magnetic tape cartridges and contains a robot arm system that functions to retrieve the magnetic tape cartridges from tape cartridge storage cells contained in the library module and load the retrieved magnetic tape cartridges on tape drive systems shown in FIG. 1 as a plurality of elements 141-144 attached to each of library modules 111, 112. Any type of information storage volume can be used in this type of library system and the 3480 tape magnetic tape cartridges are illustrated due to their widespread use in the data processing industry.

A system of control elements 120, 121, 122, 123 are illustrated connected between host computer 101 and each library module 111, 112. The control elements illustrated in FIG. 1 operate to control the robot arm mechanism in each of library modules 111 and 112. In operation, a user connected to host computer 101 requests access to data stored in a designated magnetic tape cartridge, which magnetic tape cartridge is stored in, for example, library module 111. Host computer 101 translates the request for this data into an operator console tape mount request message. Tape cartridge library software 109, 110 resides on host computers 102, 101 respectively and functions to interface the automated magnetic tape cartridge library system in transparent fashion to host computers 102, 101. This is accomplished by tape cartridge library software 110 which traps operator console messages from host computer 101 and converts these console messages into magnetic tape cartridge retrieval commands that are transmitted via data link 162, to library management unit 121.

Tape cartridge library software 110 contains a data base that provides the translation between tape cartridge volume records and the tape mount request operator console messages from host computer 101. Thus, a data retrieval request from host computer 101 is intercepted by tape cartridge library software 110 and used to scan the tape volume records to identify the exact physical location of the requested tape cartridge. Tape cartridge library software 110, determines the exact physical location of the requested tape cartridge in one of library modules 111 and 112 determines the availability of a tape drive unit in one of the tape drive systems 141–144 as well as the identity of the library module (example 112) to which this selected tape drive unit is connected. Tape cartridge library software 110 then transmits control signals over data link 161, via terminal control unit 120 and data link 162 to library management unit 121 to identify the exact location of both the requested tape cartridge and the selected tape drive unit. Library management unit 121 responds to the exact physical location control signals from tape cartridge library software 110 by determining the availability of a tape cartridge transportation path from the requested tape cartridge to the selected tape drive unit

Multiple Path Example

Figure 6:
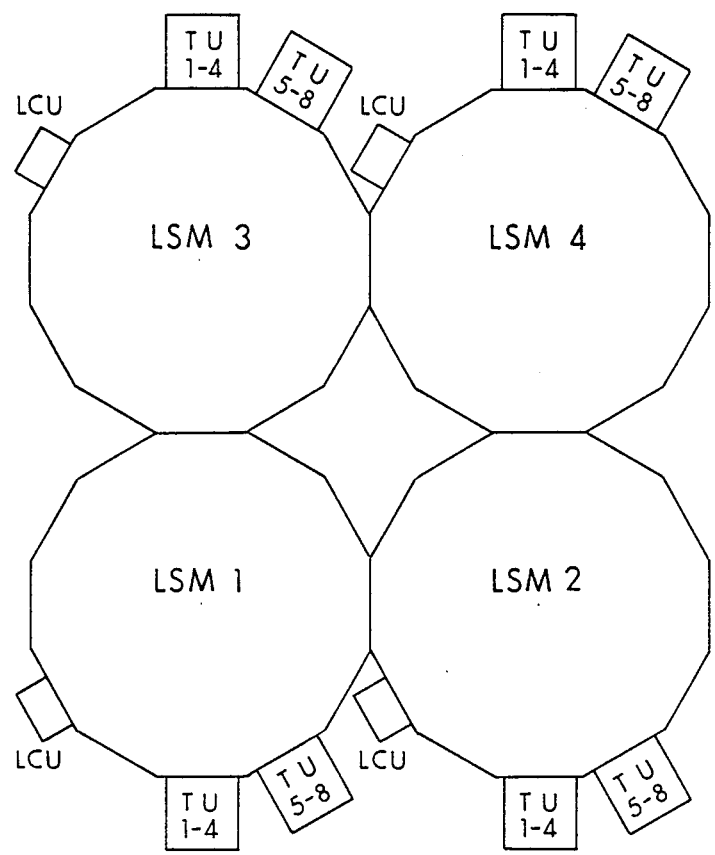
FIG. 6 illustrates a multimodule arrangement of the automated tape cartridge library system.

Library management unit 121 maintains a table that indicates the "distance" between various ones of the library modules. In a multi-module system, there are a multitude of paths that exist between two end points. To illustrate this in further detail, FIG. 6 shows one possible configuration of four library modules. These modules are labeled LSM1–LSM4. Assume for the sake of this example that the requested tape cartridge is located in library module LSM1 and the designated tape drive unit TU1 is connected to library module LSM2. It is obvious that a number of paths exist among the various library modules to transport the selected tape cartridge from its home position to the designated tape drive TU1. The most direct route is obviously from LSM1 to LSM2 directly through the pass-through port that interconnects these two library modules. However, if this pass-through port is not available, alternative paths exist through library module LSM3 or library modules LSM3 and LSM4 to transport the tape cartridge from library module LSM1 to library module LSM2. In order to transport the selected tape cartridge the minimum distance, a table is maintained in library management unit 121 which table indicates the distance between every library module and every other library module in the entire automated tape cartridge library system. Thus, in this case, library management unit 121 reads data out of the table using the identity of the library module in which the selected tape cartridge is located and the library module associated with the designated tape drive and determines that the pass-through port interconnecting library modules LSM1 and LSM2 is the shortest path to transport the selected magnetic tape cartridge. Library management unit 121 in order to effectuate the transport of the selected tape cartridge now reserves all of the apparatus in stepwise fashion required to transport the selected tape cartridge from its source to its destination.

Path Reservation

Using the system of FIG. 1 as an example, library management unit 121 designates a series of tape cartridge move operations each of which is a stepwise operation requiring an individually actuable piece of apparatus to transport the selected tape cartridge along the designated path. By concatenating this series of tape cartridge or volume move operations, the tape cartridge is moved along the designated path. Library management unit 121 reserves the pass-through port slots required for this series of volume move operations. Once all of the pass-through port slots in the entire path has been reserved, library management unit 121 translates the series of volume move operations into control signals which are transmitted via control paths 163 and 164 to library control units 122 and 123 respectively. Library management unit 121 transmits control signals over control path 163 to library control unit 122 to identify the exact physical location of the requested tape cartridge. The robot arm in library module 111 is controlled by library control unit 122 which translates the control signals received from library management unit 121 into servo control signals to regulate the operation of the various servo systems (described below) of the robot arm in library module 111. Library control unit 122 causes the robot arm in library module 111 to retrieve the requested tape cartridge from the tape cartridge storage cell in library module 111.

The retrieved tape cartridge is transported by the robot arm in library module 111 to library module 112 by way of pass-through port 150 which is a device that interconnects two library modules 111, 112. The pass-through port is a mechanism that enables adjacent library modules to pass retrieved tape cartridges back and forth between the library modules for loading on a designated tape drive or for returning to the tape cartridge storage array. The pass-through port mechanism 150 that interconnects library module 111 with library module 112, in response to control signals from library control unit 122 rotates to face the robot arm in library module 111. The robot arm in library module 111, in response to the control signals from library control unit 122, places the retrieved tape cartridge in the reserved slot in pass-through port 150. Library management unit 121 upon the completion of the tape retrieval operation by library module 111, transmits control signals on control path 163 to library control unit 122 to activate pass-through port 150 to transport the retrieved tape cartridge to face the robot arm in library module 112. Library management unit 121 then transmits control signals on control path 164 to library control unit 123 associated with library module 112. Library control unit 123 responds to these control signals by generating servo control signals to regulate the operation of the robot arm in library module 112. These control signals cause the robot arm in library module 112 to retrieve the tape cartridge placed in pass-through port 150 by the robot arm in library module 111. The tape cartridge so retrieved by the robot arm in library module 112 is then placed by the robot arm in the selected tape drive unit in tape drive system 144 as designated by library management unit 121. In this fashion, a data retrieval request from host computer 101 is translated into the identification of a designated tape cartridge, this cartridge is automatically retrieved from its storage rack and transported to a library module that contains the selected tape drive unit. That library module then loads the retrieved tape cartridge into the selected tape drive unit where it can be read by host computer 101.

Data Path

The automated tape cartridge library system contains a separate data path completely independent and isolated from the control path described above. The separate and independent data path consists of tape drive units 141–144, data paths 171–174, tape control unit 131 and data link 175. The retrieved tape is loaded onto the selected tape drive 144 where it is read in the usual fashion, with the data output on lead 174 to tape control unit 131. The data from all the tape drives 141–144 is multiplexed together in tape control unit 131 and transmitted over data link 175 to host computers 101 and 102. Thus, the data read from the retrieved tape cartridge is transmitted from tape drive unit 144 through tape control unit 131 to host computer 101 without the automated tape cartridge library system being aware of the destination of the data.

Figure 2:
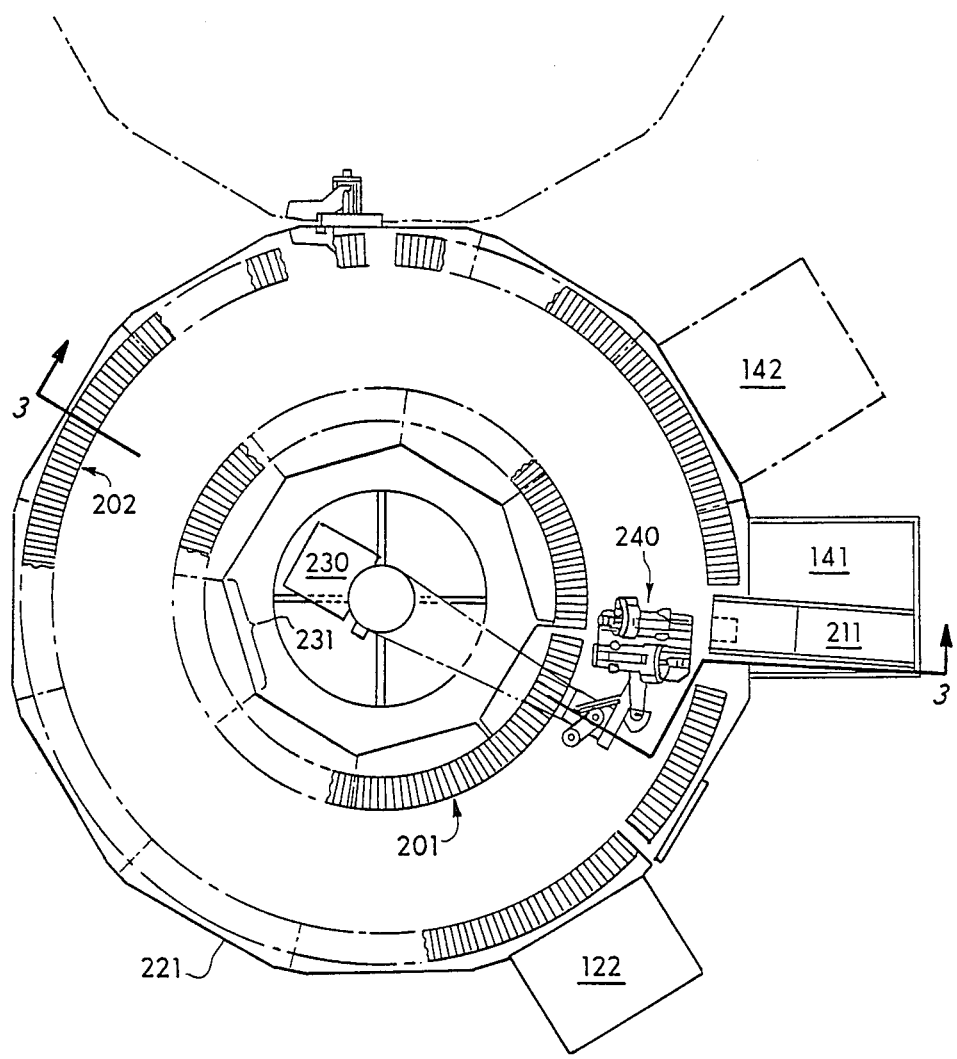
FIG. 2 Illustrates a top view of a library module.
Figure 3:
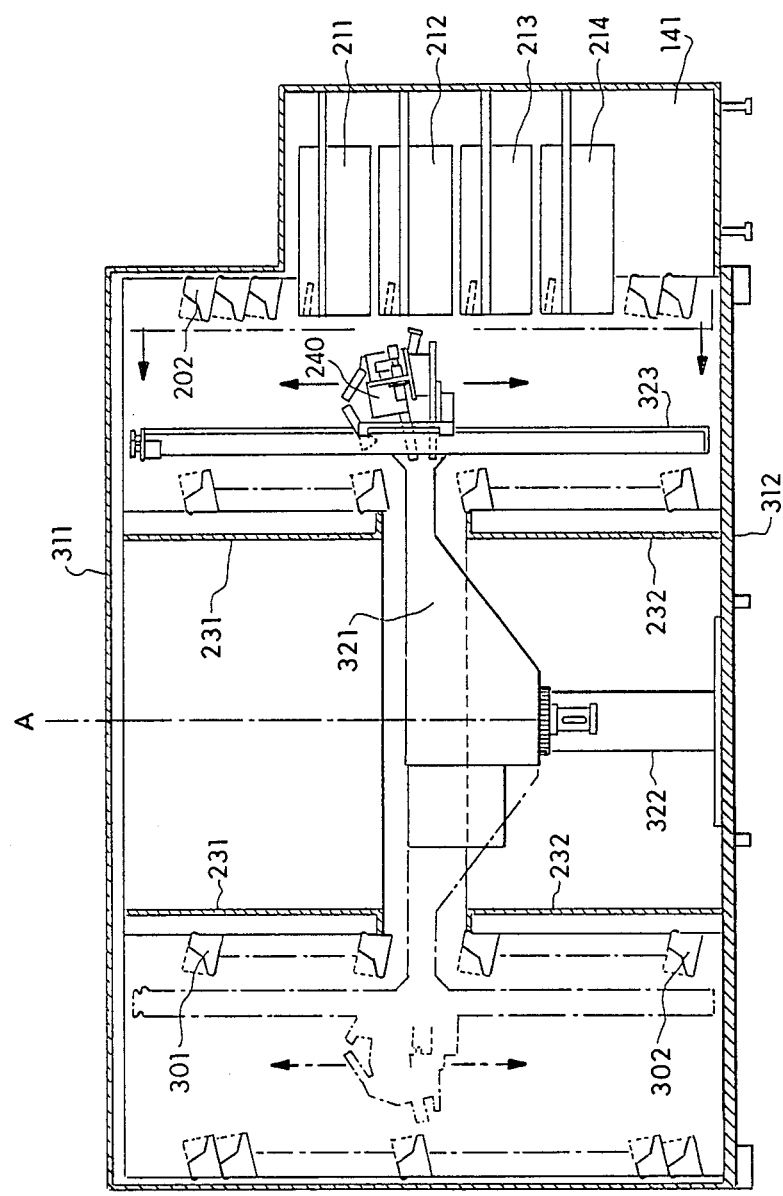
FIG. 3 illustrates a cut away view of a library module with its associated robot arm mechanism and tape cartridge storage cell array.

In order to more fully understand the operation of the tape cartridge movement management in the automated tape cartridge library system, additional details of the structure of library modules 111, 112 are disclosed below, as well as the tape cartridge library software 110 in host computer 101 and library management unit 121. FIG. 2 illustrates a top view of the library module with the ceiling removed while FIG. 3 illustrates a cut away side perspective view of library module 111.

Exterior Housing

Each library module 111 consists of a stand alone exterior housing which consists of a plurality of wall segments 221 attached to floor 312 and ceiling 311 plates and disposed about a vertical axis A. There is included an inner wall having a plurality of segments 231 forming upper portion which is suspended from a ceiling 311 of the library module 111 and another plurality of like segments 232 forming a lower portion of the interior wall which is mounted on the floor plates 312 to support a first cylindrical array 201 of tape cartridge storage cells centered about the vertical axis A. A second cylindrical array 202 of tape cartridge storage cells is concentrically arranged about the first array 201 and mounted on the wall segments 221 of the outer housing. A configuration of the segments 221 of the outer wall housing are such that the resulting structure is in the shape of a dodecahedron. The twelve-sided arrangement of the library module provides great flexibility in configuring both the tape drive units as well as configuring a plurality of library modules in a juxtaposed arrangement.

Tape Cartridge Storage Cells

Figure 5:
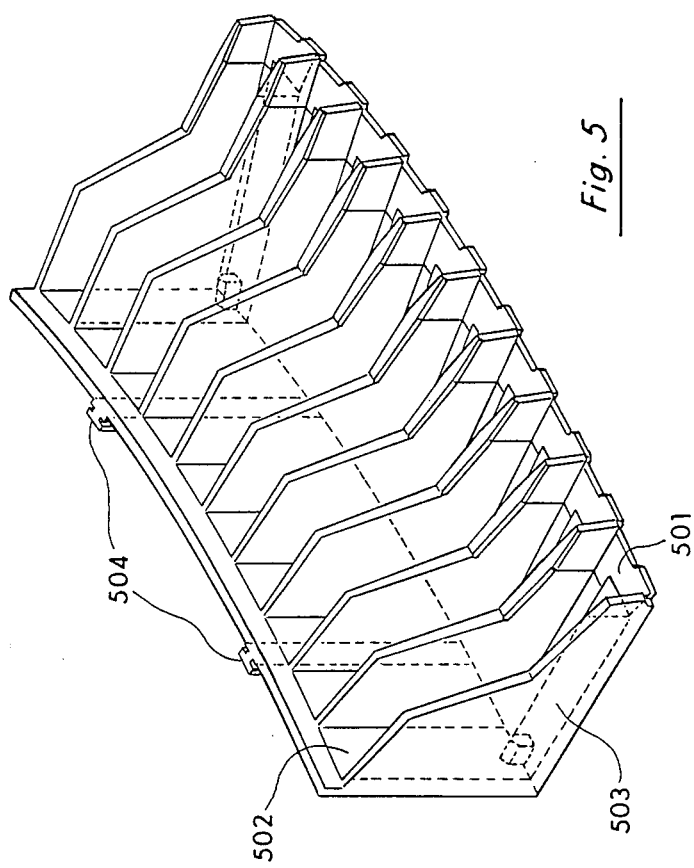
FIG. 5 illustrates a perspective view of the tape cartridge storage cells.

Library module 111 contains two concentrically arranged cylindrical arrays of tape cartridge storage cells 201, 202. FIG. 5 illustrates in additional detail the arrangement of a particular array of tape cartridge storage cells. The array of tape cartridge storage cells illustrated in FIG. 5 has a radius of curvature adapted to mounted in the inner cylindrical array 201 of tape cartridge storage cells of library module 111. The tape cartridge storage cells on the outer cylindrical array 202 are formed with an opposite curvature so that all of the tape cartridge storage cells in the inner 201 and outer 202 cylindrical arrays face each other so that the robot arm 230 can retrieve tape cartridges from either the inner 201 or the outer 202 cylindrical array. The tape cartridge storage cells illustrated in FIG. 5 consist of a bottom portion 501, a back portion 502 with intervening wall segments 503 to provide a plurality of slots or cells for the storage of the tape cartridges. Bottom portion 501 of the tape cartridge storage cells is angled downward, front to back, so that a tape cartridge placed in the tape cartridge storage cell tends to slide along bottom portion 501 into the tape cartridge storage cell. The wall segments 503 are adapted for access by the hand and finger assemblies 240 of the robot arm 230. In addition, attachment apparatus such as hooks 504 formed at the rear of the array of cells can be used to suspend the tape cartridge storage cells from the wall segments of library module 111.

The arrangement of tape cartridge storage cells is illustrated more clearly in FIG. 3 wherein the outer cylindrical array 202 is illustrated along the periphery of library module 111. The inner cylindrical array of tape cartridge storage cells 201 is illustrated in FIG. 3 as comprising two individual segments. A first segment 301 of the inner cylindrical array is arranged as standing on the floor 312 of library module 111. A second segment 302 of the inner cylindrical array 201 is illustrated in FIG. 3 as suspended from the ceiling 311 of the library module 111. In this fashion, an aperture is provided between the upper 301 and lower 302 segments of the inner cylindrical array 201 so that robot arm 230 can rotate about the center pivot axis A without interfering with any of the tape cartridge storage cells in the inner cylindrical array 201.

Robot Arm Mechanism

Figure 4:
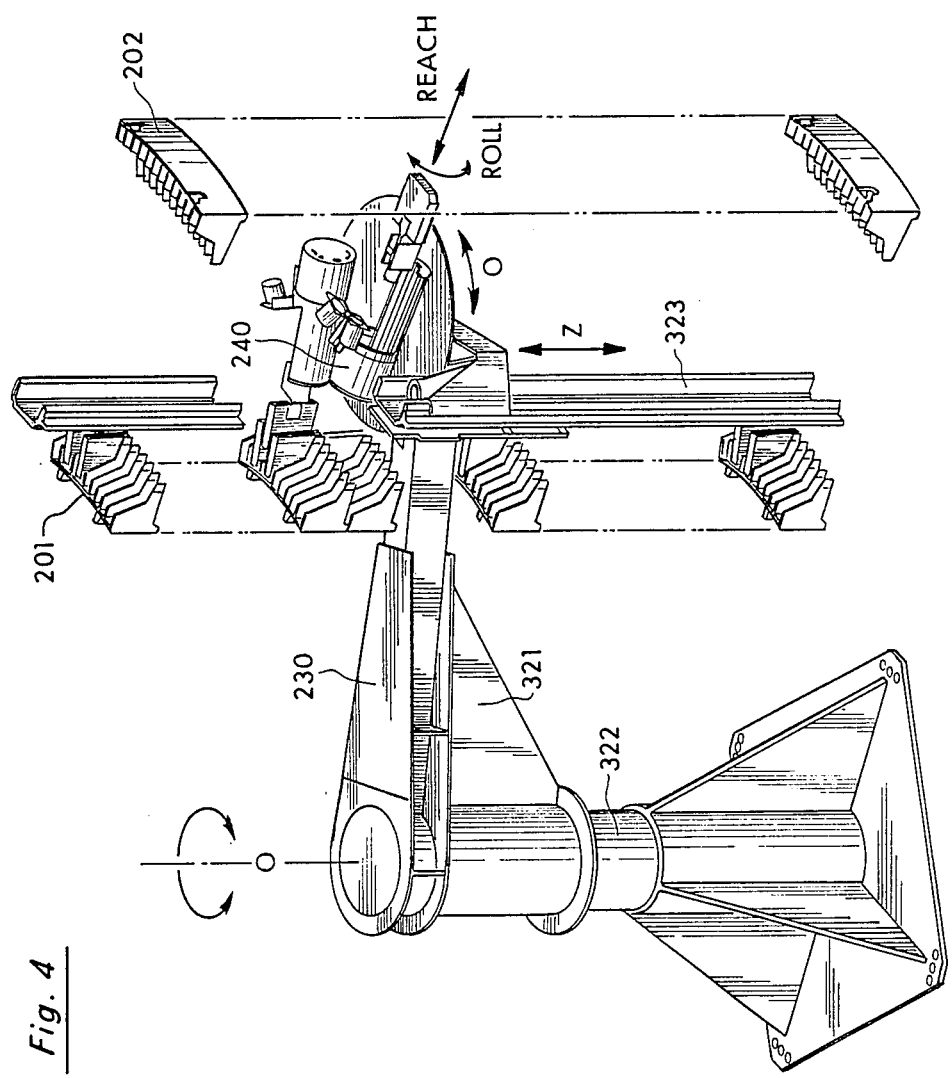
FIG. 4 illustrates a perspective view of the robot arm mechanism.

FIGS. 2, 3 and 4 illustrate a top view, side view and perspective view respectively of the robot arm assembly 230 of library module 111. The robot arm assembly 230 consists of a plurality of mechanisms all operating in conjunction to provide a movable arm for retrieving tape cartridges from their individual tape cartridge storage cells. The robot arm is described in detail in copending application Ser. No. 007,047 filed Jan. 26, 1987. The robot arm is discussed herein to illustrate the operation of this embodiment of the invention. The robot arm 230 consists of an arm assembly including a theta arm 321 rotatably mounted on a support column 322 which is attached to the floor plates 312 of library module 111. The arm assembly includes a Z mechanism 323 attached to the end of theta arm 321 remote from the support column 322. The Z mechanism 323 has coupled thereto a wrist and finger assemblies 240 which performs the actual tape retrieval from the storage cell function. The Z mechanism 323 provides a vertical range of motion for the wrist and finger assembly 240 to access various levels of the tape cartridge storage cell array. The theta arm 321 locates the Z mechanism 323 and its associated wrist and finger assembly 240 in the proper location to access both the inner 201 and outer 202 cylindrical arrays of tape cartridge storage cells. The robot arm support column 322 includes a motor which causes the theta arm 321 of the robot arm 230 to rotate about the pivotal point A of the robot arm 230 so that the robot arm 230 can access all of the tape cartridge storage cells in the circular array about the pivot point A. Thus, the elements in the robot arm assembly 230 cooperatively operate to access each and every storage cell in the entire library module 111. The servo motors controlling each of the various ranges of motion associated with elements in the robot arm assembly 230 are all controlled by control unit 122 connected to library module 111. Suffice it to say that the robot arm assembly 230 is operational to retrieve a tape cartridge from any of the approximately 6,000 tape cartridge storage cells in library module 111.

Tape Drive Unit

The tape cartridges retrieved from the individual tape cartridge storage cells are typically loaded onto a tape drive (ex 211) so that the data contained on the tape cartridge can be read by host computer 101. FIG. 2 illustrates the placement of two tape drive units 141, 142 on library module 111. The tape drive units are shown attached to two of the twelve outside walls of library module 111. Within each tape drive unit (ex 141) is located a plurality of individual tape drives 211-214 which function to read data from the tape cartridges therein. FIG. 2 illustrates a single tape drive (211) located in the tape drive unit 141 to illustrate the orientation of tape drive 211 and tape drive unit 141 with respect to the robot arm 230 and the cylindrical array of tape cartridge storage cells. In particular, a segment of the tape cartridge storage cells is removed from outer cylindrical array 202 to provide an aperture through which the front loading door opening of tape drive 211 protrudes a sufficient distance so as to be lined up with the surrounding tape cartridge storage cell arrays. The robot arm 230 can thereby load a tape cartridge into the tape drive with the same or similar range of motion as the replacement of a tape cartridge into one of the individual tape cartridge storage cells in the tape cartridge storage cell arrays. A side view of tape drive unit 141 is shown in FIG. 3 wherein four of the tape drives 211-214 are shown stacked one above the other in a vertical alignment within tape drive unit 141 illustrated in FIG. 2. As can be seen from FIGS. 2 and 3 the orientation of the tape drives 211-214 is such that a tape cartridge is placed into the tape drive (ex 211) on an angle similar to that of the individual tape cartridge storage cells with the difference being that the tape drive 211 requires a horizontal loading of the tape cartridge while the tape cartridge storage cells store the tape cartridges in a vertical alignment. Thus the robot arm 230 in retrieving a tape cartridge from an individual tape cartridge storage cell and loading it into a tape drive unit 141 must rotate the tape cartridge through a 90 degree angle for proper orientation for loading into the tape drive 211.

Pass-Through Port Mechanism

Figure 8:
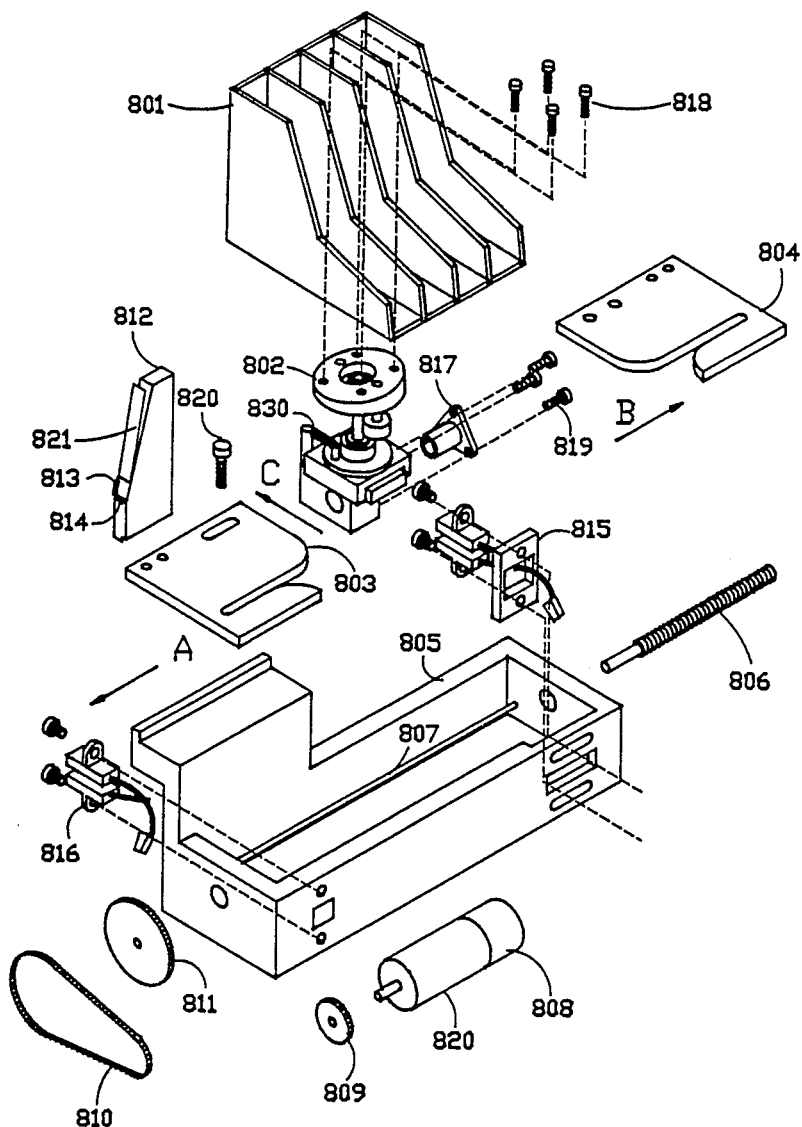
FIGS. 8 and 9 illustrate the pass-through port mechanism.
Figure 9:
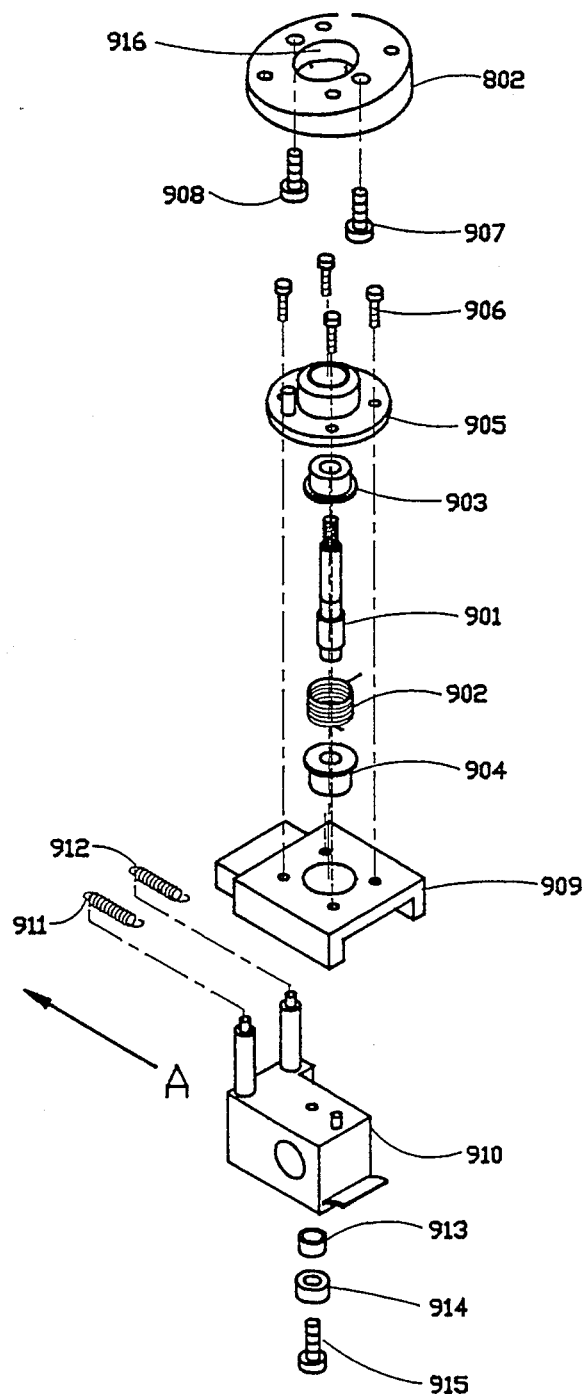

The method of interconnecting the library modules in juxtaposed position so that the robot arm contained in a library module can operate cooperatively with the robot arms in adjoining library modules is the pass-through port mechanism 150 disclosed in more detail in FIGS. 8 and 9. It is apparent that the task of interconnecting library modules is a non-trivial one since there are numerous misalignments that can take place between adjacent juxtaposed library modules 111, 112. The vertical alignment as well as horizontal alignment discrepancies between modules can cause simple yet disturbing module interconnection difficulties. In addition, any angular displacement about the three axes can cause serious misalignment problems so that the use of a robot arm to pass a tape cartridge from one library module to another can be frustrated by any of the above-described misalignments individually or in combination.

The solution to this perplexing problem is the use of a pass-through port 150 which automatically aligns the tape cartridge received from one robot arm in a library module to the orientation and alignment required of a robot arm in the adjoining juxtaposed library module. The pass-through port 150 consists of a set of transport storage cells 801 into which a robot arm places tape cartridges, which transport storage cells 801 are configured in similar fashion to the tape cartridge storage cells in the inner and outer cylindrical arrays. The mechanism to which this set of transport storage cells 801 is connected performs a number of functions. The mechanism transfers the orientation of the transport storage cells 801 from facing a first robot arm in a first library module to a 180 degree rotation to face the robot arm in the adjoining library module. This rotation is accomplished as the transport storage cells 801 are moved horizontally through adjoining openings in the walls of the corresponding library modules. The mechanism that provides this horizontal transport function also provides a self-aligning arrangement which translates the transport storage cells 801 through lateral, angular and horizontal distance alignment orientations so that the transport storage cells 801 exactly align with the tape cartridge storage cell arrays in the destination library module. The location of the pass-through port access holes at each library module are precisely placed so that the end points of the pass-through port mechanism 150 are precisely defined with respect to the axis of the robot arm of the adjoining library modules. It is the intermediary apparatus that connects these apertures in the adjoining library modules that provides the alignment function for the transport storage cells 801 as they traverse the distance from one library module to adjoining library module. This functionality enables a plurality of library modules to be interconnected so that these tape cartridges can be efficiently and expeditiously passed from one library module to another. This provides expansion capability of the automated tape cartridge library system heretofore unavailable for any automated tape library system.

The pass through port mechanism is illustrated in further detail in FIGS. 8 and 9. Pass through port 150 consists of frame 805 which is connected at one end to library module 115. Frame 805 includes lead screw 806 and guide shaft 807 on which carriage mechanism 830 rides. An electric motor 820 has an attached gear 809 which, by means of belt 810 drives gear 811 to turn lead screw 806. In conventional fashion, when lead screw 806 rotates the carriage mechanism 830 translates along the longitudinal length of frame 805 while riding on guide shaft 807 which also prevents the carriage mechanism 830 from rotating due to the movement of lead screw 806. Carriage mechanism 830 is shown in further detail in FIG. 9 and as shown in FIG. 8 supports an array of transport storage cells 801. Transport storage cells 801 are a segment of the standard tape cartridge storage cells used in the storage arrays of the automated library module 111. A pair of cams 803 804 are also connected by means of screws 820 to frame 805. The cams 804 are shaped so that the carriage mechanism 830, as it traverses the length of frame 805 encounters the surface of cams 803 and 804. The carriage mechanism 830 is a spring loaded mechanism which follows the surface of cams 803 and 804 to rotate the transport storage cells 801 through a full 180 degree rotation. In particular, when the carriage mechanism 830 is to the far forward of frame 805, which end is indicated by the arrow A, the transport storage cells 801 face their open ends in direction A. The angular arrangement of the notch in the cam 803 is such that the transport storage cells 801 point directly to the center axis A of the robot arm mechanism as illustrated in FIGS. 2, 3, and 4. As electric motor 820 drives gears 809 and 811, turning lead screw 806 which causes carriage mechanism 830 to traverse the length of frame 805 until it reaches the far end of frame 805. As it approaches the far end of frame 805, which end is termed the slave end of the pass through port, carriage mechanism 830 encounters cam 804 which serves to rotate transport storage cells 801 through 180 degree rotation so that the open end of transport storage cells 801 faces the center axis A of the robot arm mechanism of the library module 112 to which the pass through port 150 is connected.

The rotational operation of this mechanism may be further understood by viewing FIG. 9 which is an exploded detail of the transport mechanism 830. The transport mechanism 830 consists of a center pivot shaft 901 around which is wound torsion spring 902. Washers 903 and 904 maintain the bottom end of torsion spring 902 in a fixed relation to frame 909 and allows the top end of torsion spring 902 to rotate about pivot shaft 901. The rotation of the torsion spring around pivot shaft 901 causes plates 802 and 905 to rotate. The torsion spring 902 is biased in a fashion so that transport storage cell 801 faces in the direction illustrated in FIG. 8 that is perpendicular to the movement of the carriage mechanism 830 along the length of frame 805. Thus, until carriage mechanism 830 comes in contact with either cam 803 or 804, the transport mechanism 830 faces transport storage cells 801 in the direction shown in FIG. 8. To compensate for any horizontal or lateral misalignments between adjacent library modules, transport carriage 830 is equipped with a pair of guide rollers 907 and 908 which follow the contours of cams 803 and 804. In addition, a slide mechanism 909 is provided to provide a range of motion perpendicular to the direction of travel of transport carriage 830, in direction C. This is accomplished by a pair of springs 911 and 912 attached to posts on housing 910 biasing slide mechanism 909 in the direction C illustrated in FIG. 8. As transport carriage 830 traverses the length of frame 805, guide rollers 907 and 908 come into contact with either cam 803 or 804 and the surfaces of cams 803 and 804 rotate transport storage cells 801 in either direction A or B as well as laterally displacing slide mechanism 909 to account for lateral misalignments of the adjacent library modules. The position of transport carriage 830 at either end of frame 805 is detected by means of a sensor mechanism which consists of flag 917 attached to the transport carriage 830 with a pair of sensors 815 and 816 located at either end of frame 805. Thus, when transport carriage 830 is an either end position along frame 805, flag 917 will make contact with either sensor 815 or 816 to indicate at which end of the pass through port the transport carriage 830 and transport storage cells 801 are located. In addition, a shaft encoder 808 attached to electric motor 820 counts the revolutions of the motor. The shaft encoder 808 provides a digital output to indicate how many revolutions have taken place in electric motor 820 thereby indicating the position of transport carriage 830. Pass through port 150 is also equipped with a positioning target 812 which consists of a housing that has a horizontal target 814 and a vertical target 813 attached to the front thereof for positioning alignment by the vision system of the robot arm. In addition, a label area 821 is provided so that pass through port 150 can be identified by use of a label readable by the vision system of the robot arm. One of these targets exists at either end of the pass through port and is connected to cam 803 and 804 respectively to indicate the position of transport storage cells 801 since cam 803 and 804 accurately position transport storage cells 801 with respect to targets 813 and 814 irrespective of the alignment of the adjacent library modules.

Volume Mount Operation

When host computer 101 requests that a designated tape cartridge be mounted, tape cartridge library software 110 intercepts this console command and insures that the tape cartridge drive is available. If the tape cartridge drive is available, tape cartridge library software 110 transmits robot arm control commands to the 3274 terminal control unit (120) which acts as a protocol converter interface between host computer 101 and library management unit 121. The 3274 terminal control unit 120 converts the control messages received from host computer 101 into a format that is compatible with library management unit 121 and transmits these adapted control messages over a data link 162. Library management unit 121 is configured to look like a 3278 Model 2 terminal and, therefore, requires a 3274 terminal control unit to be interposed between the host computer 101 and the library management unit 121. Library management unit 121 takes the control messages transmitted from host computer 101 by way of tape cartridge library software 110 and adapts these commands to operate the robot arm in library module 111.

The control messages received from tape cartridge library software 110 by library management unit 121 consist of an information storage volume or tape cartridge mount command, an indication in which library module 111 the tape cartridge resides, its exact physical location in library module 111 is designated by: panel in the tape cartridge storage array and row/column indication of where on this particular panel the tape cartridge is stored. In addition, control signals indicate the destination tape drive unit 144 in library module 112.

Library management unit 121 signals library control unit 122 which utilizes the received control signals to position the robot arm so that the retrieval mechanism, the robot hand, is positioned to the correct panel/row/column location associated with the designated tape cartridge to be retrieved. The vision system on the robot arm examines the identification label on th e tape cartridge and, when the identification is verified as matching that indicated by host computer 101, the robot hand is extended, the cartridge is grasped and removed from the storage cell in which it has been placed. The robot hand retrieves the cartridge and once the cartridge has cleared the side of a particular storage cell, the next operation is performed. Library control unit 122 activates pass-through port 150 to translate transport carriage 830 to the library module 111 end of frame 805. Once transport carriage 830 faces the robot arm of library module 111, library control unit 122 activates the robot mechanism to relocate to an alignment with the reserved slot in pass through port 150. Library management unit 121 signals library module 111 to insert the retrieved tape cartridge into the reserved slot in transport carriage 830 and the robot hand is extended and the tape cartridge placed in the specified transport storage cell. The robot hand is then retracted and the robot arm is available for any other tape cartridge retrieval operation.

Library management unit 121 in response to the placement of the retrieved tape cartridge in the reserved one of transport storage cells 801 in pass through port 150 transmits control signals to library control module 122 which controls pass-through port 150 to transport the retrieved tape cartridge to library module 112. Library control module 122 signals pass through port 150 to activate the drive mechanism therein to transport the transport storage cells 801 with the retrieved tape cartridge from the first library module 111 to the second library module 112. As discussed above, in response to these control signals the pass through port mechanism relocates transport storage cells 801 from an alignment within the first library module 111 through the horizontal distance separating the two library modules to an alignment with the robot arm in the second library module 112. Upon the completion of this transfer, a sensor is activated in pass through port 150 which sensor transmits a signal to library management unit 121 via library control unit 123 to indicate that the pass through port operation has been completed. The library management unit 121 in a response to the signals received from pass through port 150, signals the robot arm in library module 112 via library control unit 123 to take the retrieved tape cartridge from pass through port 150. Library control unit 123 then signals the robot arm to place the retrieved tape cartridge in the selected tape drive unit 144. The robot arm already has the retrieved tape cartridge and library control unit 123 transmits servo control signals to the robot arm to position the robot arm opposite selected tape drive unit 144 and to load the retrieved tape cartridge into the selected tape drive 211. Once the robot arm loads the tape cartridge in tape drive 211, tape control unit 131 interconnects tape drive 211 with host computer 101 by way of data paths 175 and 173.

Tape control unit 131 manages the writing and reading of data to and from the attached tape drive systems 141–144. Tape control unit 131 can be connected to up to four tape drive systems 141–144 each of which contains four tape drive units. Thus a tape control unit 131 can interconnect up to sixteen tape drive units with the host computer 101. The data path 175 interconnects tape control unit 131 with host computer 101 contains four data channels. Tape control unit 131 receives commands from host computer 101 over these four data channels, decodes these commands and selects tape drive units and issues commands to them, and passes data from the channel to the tape drive units and vice versa. Thus, tape control unit 131 functions as a multiplexer interconnecting the sixteen tape drive units to the four data channels connected to the host computer. Data, control and status signals are passed back and forth between host computer and the tape drive units by way of tape control unit 131. In addition, tape control unit 131 contains a data buffer which is a first-in-first-out dynamic random access memory connected between the four data channels 175 connected to the host computer 101 and the tape drive units located in the tape drive systems 141–144. The data buffer masks the inherent slowness of a mechanical tape drive system and permits data transfers to and from the automated tape cartridge library system at data channel speeds. In addition, while data to and from the tape drive unit flows at a rate proportional to the speed of the moving magnetic tape on a magnetic tape cartridge, the channel can begin writing data to this data buffer while the magnetic tape is coming up to speed. The channels can write in the data buffer the data it wants to transfer, disconnect from the connection, leaving the data buffer to send data to the tape drive unit without further involvement of the channel. In the reverse direction, a channel waits until all or most of the data from the file stored on the tape cartridge is in the data buffer and reconnects to the channel and transfers the data to host computer 101.

Tape Cartridge Movement Management

Figure 10:
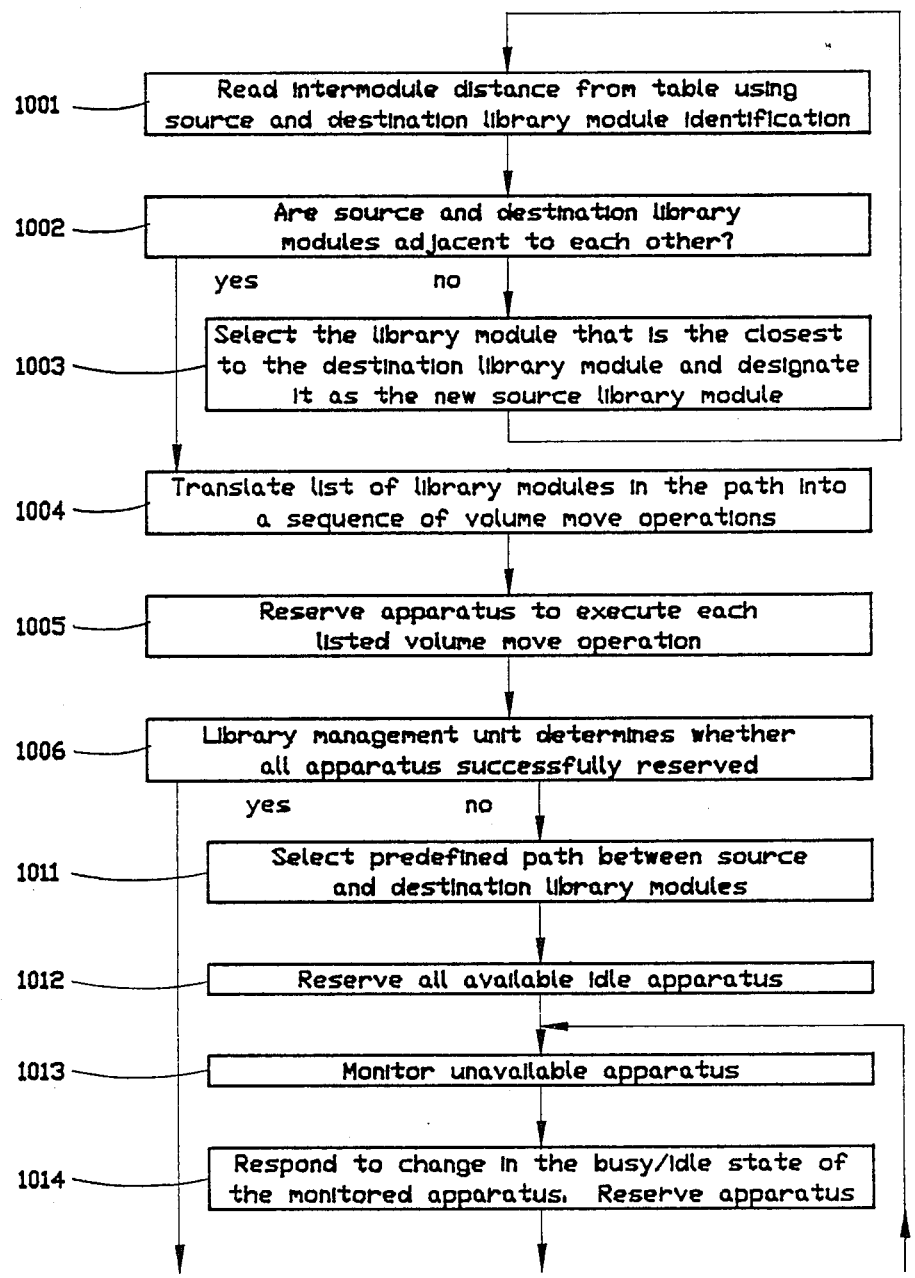
FIGS. 10 and 11 illustrate, in flow diagram form, the operational steps taken by the automated tape cartridge library system to select and transport a tape cartridge.
Figure 11:
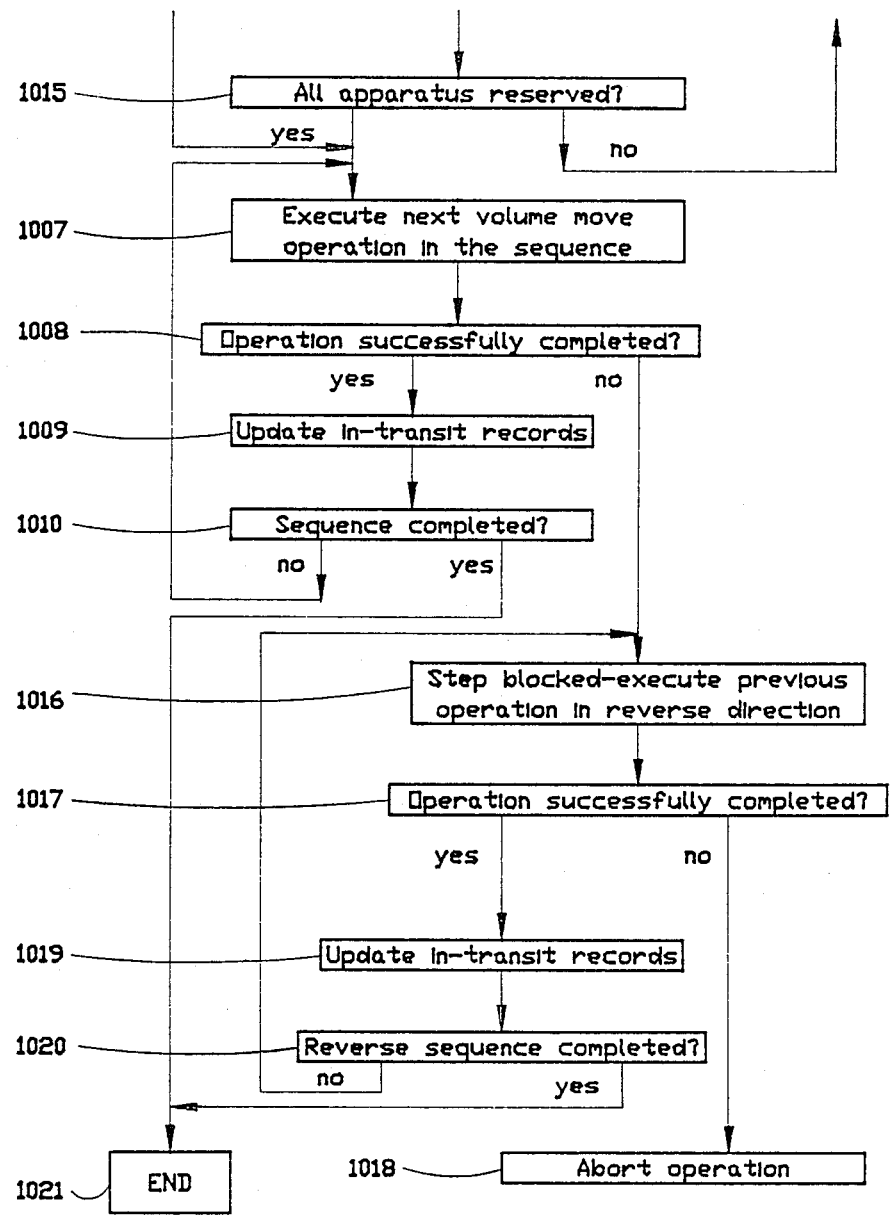

FIGS. 10 and 11 illustrate in flow diagram form the operational steps taken by library management unit 121 to control movement of a tape cartridge within the automated tape cartridge library system. The process begins at step 1001 where the source and destination identification information is used to read out a distance from the distance table of FIG. 7. At step 1002 the distance read out at step 1001 is analyzed to determine whether the source and destination library modules are adjacent; that is, whether the distance between these two modules is one. If these two library modules are not adjacent, at least another step in the path selection process must be undertaken. Processing advances to step 1003 in this case, where the library module listed in the table as being the shortest distance from the destination library module, adjacent to the present source library module and having an available pass-through port is selected as the next step in the path for transporting the tape cartridge from its home position to the designated tape drive unit. This selected library module is then designated as a new source library module and processing returns to step 1001 where the distance between the source and destination library modules is again read out from the distance table. This sequence of operations 1001–1003 is repeated until at step 1002 the source and destination library modules are adjacent.

At this point, the last step in the path selection process has been reached and all of the iterations of steps 1001–1003 as recorded in memory have defined a sequentially ordered set of path segments, where these segments are concatenated together to form the path between the end points of the home position of the selected tape cartridge and the designated tape drive unit which is the destination of the tape cartridge. At this point, path definition is complete and processing advances to step 1004 where the list of library modules that constitute the path is read out of memory and converted into a sequence of volume move operations or sequentially ordered set of path segments, where these segments are concatenated together to form the path. At step 1005, this sequence of volume move operations is used to identify the various individually actuable apparatus required in the library modules to execute the transfer of the selected tape cartridge from its home position to the designated tape drive unit. The apparatus reservation consists of designating or reserving a slot in the pass-through port that interconnects the various library modules designated in the path. In addition, the robot arm in each library module in the path of the tape transport is reserved as the tape cartridge is moved along the designated path to move the designated tape cartridge from one pass-through port to another until it reaches the destination designated tape drive. At step 1006, library management unit 121 determines whether all the apparatus (pass-through port slots) required to transport the designated tape cartridge along this path has been successfully reserved. If all of this apparatus has been reserved, processing advances to step 1007 where the execution of this sequence of volume move operations is undertaken.

Execute Sequence of Volume Move Operations

At step 1007 the next step in the sequence of volume move operations is executed by library management unit 121 transmitting control signals to the control unit of the library module associated with the particular volume move operation presently being executed. Library management unit 121 transmits the control signals indicative of the volume move operation to be executed as part of this sequence. The control unit associated with the library module performing the volume move operation receives the control signals and controls the operation of the particular apparatus designated by the control signals from library management unit 121. For example, the control unit may activate the robot arm in the associated library module to retrieve the designated tape cartridge from its home position or transport the designated tape cartridge to a predefined slot in the pass-through port that interconnects this library module with the next library module in the path. At step 1008, the control unit associated with this library module signals library management unit 121 whether the step or the volume move operation was successfully completed. If the operation was successfully completed, at step 1009 the library management unit updates the intransit record to indicate the present position of the designated tape cartridge in the automated tape cartridge library system. At step 1010 library management unit 121 determines whether the sequence of volume move operations has been completed. If the sequence has not been completed, processing returns to step 1007 where the next step in the sequence of volume move operations is executed. Steps 1007–1010 are repetitively executed until all of the steps in the sequence of volume move operations have been successfully completed. At this point, processing advances to step 1021 where all of the apparatus reservations executed at step 1005 are released and the apparatus are available for another operation in the automated tape cartridge library system.

No Path Available

There are a number of instances where the transportation of the designated tape cartridge from its home position to the designated tape drive is not successfully completed as outlined above. For example, at step 1006 when library management unit 121 checks to determine whether all of the apparatus required to execute the sequence of volume move operations has been successfully reserved and determines that one or more apparatus is not available during the reservation process. At this point, processing advances to step 1011 where the path selection accomplished in steps 1001–1003 is canceled, if this tape cartridge movement request is the oldest queued request, and a predefined path from the home position of the selected tape cartridge to the designated tape drive is read out of memory and used as the path for transporting this designated tape cartridge. At step 1012, library management unit 121 reserves all of the apparatus required to execute the sequence of volume move operations that constitute the predefined path of step 1011. Since there are various apparatus that are not available at step 1013, library management unit 121 begins to monitor all of the apparatus that was unavailable to perform the operations required in the sequence of volume move operations that define the predefined path of step 1011. At step 1014, library management unit 121 responds to any state change of one of the unreserved or unavailable apparatus that is being monitored in step 1013 by reserving this apparatus when it enters an idle or available state. At step 1015 library management unit 121 determines whether this last reservation of apparatus successfully completes the required list of apparatus reservations required to execute the sequence of volume move operations that define the predefined path of step 1011. If not, processing again advances to step 1013 where the remaining unavailable apparatus is again monitored. Processing continues through steps 1013–1015 until all of the elements required to execute the predefined path have been reserved. At this point, processing advances to step 1007 as described above where the movement of the designated tape cartridge can be accomplished.

Blocked Volume Move Operation

Another variation in the movement of the designated tape cartridge can occur at step 1008 where a particular volume move operation is blocked for various reasons, such as an equipment failure. At this point processing advances to step 1016 where library management unit 121 reverses designated tape cartridge movement operations so that the designated tape cartridge is returned to its home position over the original path selected by library management unit 121. This is accomplished at step 1016 by library management unit 121 signalling the control unit that attempted to execute the blocked volume move operation to reverse its order and replace the tape cartridge in the position it occupied prior to this volume move operation. At step 1017, library management unit 121 determines whether this step was successfully completed based on control signals returned to library management unit 121 from the control unit associated with the last mentioned volume move operation. If the step is not successfully completed, processing is aborted at step 1018 and an error message printed out to an operator to indicate that the movement of the designated tape cartridge is blocked in the forward direction and this designated tape cartridge can also not be returned to its home position. If the step was successfully completed at step 1017, processing advances to step 1019 where library management unit 121 updates the intransit records as described above. At step 1020, library management unit 121 determines whether the reverse sequence of volume move operations has been completed and the designated tape cartridge now occupies its home position. If not, processing returns to step 1016 where the next previous step in the sequence of volume move operations is executed in reverse order to retrace the path of the designated tape cartridge back toward its home position. Processing of steps 1017–1020 is repeated until the designated tape cartridge has been returned to its home position. Once this occurs, processing advances to step 1021 where all of the apparatus reservations accomplished at step 1005 are erased and all of the apparatus required to perform the sequence of volume move operations that constitute the designated path are now available for other uses by the automated tape cartridge library system.

Thus, the tape cartridge movement management apparatus described above maintains an indication of the exact location of every tape cartridge in the automated tape cartridge library system, whether in its home position or in transit. This is necessary as part of the path selection and tape cartridge movement function since a tape cartridge blocked in its path toward a designated destination must be returned to its home position or it will interfere with the transportation of other tape cartridges among the various library modules in the automated tape cartridge library system. The path selection and control process described above reserves all of the apparatus required to execute the sequence of volume move operations that defines the path between the two designated end points. The path reservations are maintained throughout the course of the tape cartridge movement until the tape cartridge has successfully reached its destination. This insures that if a volume move operation is blocked somewhere in the sequence of steps or path segments, the tape cartridge can be successfully returned to its starting position by retracing the sequence of volume move operations that have been executed to bring the tape cartridge to its present position. Since the apparatus that constitutes the path remains in a reserved state, it is available to retrieve the designated tape cartridge from its present position and return it back to its home position. This method of path reservation and path retracing insures that the tape cartridge will not be stranded between source and destination end points with no method of retrieval being available.

While a specific embodiment of the invention has been disclosed, variations within the scope of the appended claims are possible, and are contemplated. There is no intention of limitation to what is contained in the abstract or the exact disclosure as herein presented. The above-described apparatus is illustrative of the application of the principles of this invention. Normally, other arrangements may be devised by those skilled in the art without departing from the spirit and the scope of the invention.

I claim:

1. Apparatus for performing the path management function in a system that contains a plurality of individually actuable and concatenatable path segments to define a path between a first and a second endpoint comprising:
    means responsive to the designation of said first and said second endpoints for selecting a sequentially ordered plurality of said path segments to define a path between said first and said second endpoints;
    means for reserving all of said selected path segments;
    means for sequentially activating said reserved path segments; and
    means for maintaining said reserved path segments in a reserved state until all of said reserved path segments have been sequentially activated between said first and said second endpoints.

2. The apparatus of claim 1 further including
    means responsive to said path to said second endpoint being blocked, for retracing said path via said reserved path segments to said first endpoint.

3. The apparatus of claim 2 wherein said retracing means includes:
    means for disabling said sequentially activating means for the one of said reserved path segments where said path is blocked; and
    means for sequentially activating in the reverse direction and reverse order the ones of said reserved path segments executed by said sequentially activating means.

4. In a network of interconnected library modules, a method of managing the movement of an information volume stored in a source location in a first library module to a destination location in a second library module comprising the steps of
    defining a series of volume move operations in said interconnected library modules to transport said information volume from said source location to said destination location;
    reserving apparatus in each of said interconnected library modules to execute said series of volume move operations;
    sequentially executing said series of volume move operations when all of said apparatus to complete said path is reserved; and
    maintaining said apparatus reservations until all of said series of volume move operations are executed and said information storage volume is at said destination location.

5. The method of claim 4 including the step of
    executing in reverse order and direction the ones of said volume move operations that have been sequentially executed when one of said volume move operations in said series of volume move operations is blocked.

6. The method of claim 4 wherein the step of defining includes the steps of:
    selecting a predefined path from said source location to said destination location when said series of volume move operations cannot be defined because all of the apparatus necessary to implement said series of volume move operations is not idle; and
    translating said predefined path into a predefined series of volume move operations to transport said information storage volume from said source location to said destination location.

7. The method of claim 6 wherein the step of reserving includes the steps of:
    reserving idle apparatus in each of said interconnected library modules to execute said predefined series of volume move operations;
    monitoring all of the unreserved apparatus in said predefined series of volume move operations to determine the busy/idle state of said unreserved apparatus; and
    reserving each of said unreserved apparatus when said unreserved apparatus enters an idle state.

8. The method of claim 4, further including the step of:
    recording in a memory the present location of said information storage volume upon the completion of each of said volume move operations.

9. A method of managing a transportation path in an automated library system which contains a plurality of automated library modules, each of said automated library modules juxtaposed to at least one other one of said automated library modules, where information storage volumes are stored in volume storage locations in each of said automated library modules for use on a plurality of information storage volume read/write devices connected to said automated library modules, comprising the steps of:

defining a series of volume move operations that implement an information storage volume transportation path from a designated volume storage location to a destination information storage volume read/write device;

reserving apparatus in each of said automated library modules to execute said series of volume move operations;

robotically executing said series of volume move operations once said apparatus is reserved to execute all of said series of volume move operations; and maintaining said apparatus reservations on said apparatus to execute all of said series of volume move operations until said series of volume move operations is completely executed.

10. The method of claim 9 further including the step of:

executing in reverse order and direction the ones of said volume move operations in said series of volume move operations that have been sequentially executed when one of said series of volume move operations is blocked.

11. The method of claim 9 wherein said step of defining includes the step of:

selecting a predefined path from said designated information volume storage location to said destination information storage volume read/write device when said series of volume move operations cannot be defined because one or more of said volume move operations include apparatus that is in a busy state.

12. The method of claim 11 wherein said step of defining further comprises the step of:

translating said predefined path into a predefined series of volume move operations that implement said predefined path.

13. The method of claim 12 wherein said step of reserving includes the steps of:

reserving idle ones of said apparatus in each of said automated library modules to execute said predefined series of volume move operations;

monitoring the busy ones of said apparatus in each of said automated library modules to execute said predefined series of volume move operations; and reserving each of said busy apparatus when said busy apparatus changes to an idle state.

14. The method of claim 9 including the step of:

recording in a memory the present location of said information storage volume upon the completion of each robotically executed volume move function.

15. In an automated library system which stores information storage volumes in volume storage locations for retrieval and placement into ones of a plurality of information storage volume read/write devices, an information storage volume transportation management apparatus comprising:

means responsive to a request to read/write a designated information storage volume for selecting an information storage volume read/write device;

means responsive to said selecting means for defining a path, comprising a plurality of sequentially ordered volume move segments, between said designated information storage volume and said selected information storage volume read/write device;

means responsive to said defining means for reserving apparatus to execute said plurality of volume move segments;

means responsive to said reserving means for sequentially activating said reserved apparatus to execute said plurality of sequentially ordered volume move segments; and means for maintaining said reserved apparatus in a reserved state until all of said plurality of volume move segments are executed.

16. The apparatus of claim 15 further comprising:

means for activating, in reverse order, the ones of said reserved apparatus activated by said sequentially activating means when one of said volume move segments cannot be executed.

17. The apparatus of claim 15 further comprising:

means, in said defining means, for selecting a predesignated path between said designated information storage volume and said selected information storage volume read/write device when one or more of said apparatus to execute said plurality of move segments is in a busy state.

18. The apparatus of claim 17 further comprising:

means, in said reserving means, for monitoring the busy/idle state of said one or more apparatus.

19. The apparatus of claim 18 further comprising:

means, in said reserving means, responsive to one of said one or more apparatus changing to an idle state, for reserving said one apparatus.

20. The apparatus of claim 15 further comprising:

means, responsive to said sequentially activating means, for recording the present location of said designated information storage volume upon the completion of each volume move operation.

21. In a network of apparatus, operable to interconnect selected ones of network endpoints, apparatus for defining a path between a first and a second endpoint comprising:

means for selecting two or more of said apparatus operable to interconnect said first and said second endpoints;

means for reserving said selected apparatus;

means for activating said reserved apparatus in a sequential order to create a path interconnecting said first and said second endpoints;

means for maintaining said reserved apparatus in a reserved state until said first and said second endpoints are interconnected.

22. In an automated library system which contains a plurality of automated library modules, each of said library modules juxtaposed to at least one other one of said library modules and interconnected therewith, where information storage volumes are stored in volume storage locations in each of said automated library modules for use on a plurality of information storage volume read/write devices connected to said automated library modules, an information storage volume movement management apparatus comprising:

means responsive to a request to read/write a designated information storage volume for selecting an information storage volume read/write device;

means responsive to said selecting means for defining a path, comprising a plurality of sequentially ordered volume move segments, between said designated information storage volume and said selected information storage volume read/write device;

means responsive to said defining means for reserving apparatus in said plurality of automated library modules to execute said plurality of volume move segments;

means responsive to said reserving means for sequentially activating said reserved apparatus to execute said plurality of sequentially ordered volume move segments;

means, responsive to said sequentially activating means, for recording the present location of said designated information storage volume upon the completion of each volume move operation;

means for maintaining said reserved apparatus in a reserved state until all of said plurality of volume move segments are executed; and means for activating, in reverse order and direction, the ones of said reserved apparatus activated by said sequentially activating means when one of said volume move segments cannot be executed.

* * * * *

UNITED STATES PATENT AND TRADEMARK OFFICE
Certificate

Patent No. 4,864,438                                                                                       Patented: Sept. 5, 1989

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
Frederick G. Munro and Robert William Schmidt.

Signed and Sealed this Twenty-Third Day of October 1990

STUART LEVY

*SPE, Art Unit 239*